US00RE34085E

United States Patent [19]

Rose et al.

[11] E Patent Number: Re. 34,085

[45] Reissued Date of Patent: Sep. 29, 1992

[54] THERMOPLASTIC AROMATIC POLYETHERKETONES

[75] Inventors: John B. Rose, Letchworth; Philip A. Staniland, Tewin Wood, both of England

[73] Assignee: Imperial Chemical Industries, London, England

[21] Appl. No.: 498,116

[22] Filed: May 25, 1983

Related U.S. Patent Documents

Reissue of:

[64] Patent No.: 4,320,224
Issued: Mar. 16, 1982
Appl. No.: 956,045
Filed: Oct. 31, 1978

U.S. Applications:

[63] Continuation-in-part of Ser. No. 873,477, Jan. 30, 1978, abandoned.

[30] Foreign Application Priority Data

Sep. 7, 1977 [GB] United Kingdom ..... 37345
Jan. 13, 1978 [GB] United Kingdom ..... 1412

[51] Int. Cl.[5] ..... C08G 65/40

[52] U.S. Cl. ..... 528/125; 528/126; 528/128; 528/219

[58] Field of Search ..... 528/125, 126, 128, 219

[56] References Cited

U.S. PATENT DOCUMENTS

| | | | |
|---|---|---|---|
| 3,332,909 | 7/1967 | Farnham et al. | 528/219 |
| 3,928,295 | 12/1975 | Rose | 528/125 |
| 3,956,240 | 5/1976 | Dahl et al. | 528/125 |
| 4,010,147 | 3/1977 | Rose | 528/125 |
| 4,056,511 | 11/1977 | Staniland | 528/125 |
| 4,105,635 | 8/1978 | Freeman | 528/126 |
| 4,105,636 | 8/1978 | Taylor | 528/126 |
| 4,108,837 | 8/1978 | Johnson et al. | 528/126 |
| 4,247,682 | 1/1981 | Dahl | 528/125 |
| 4,339,568 | 7/1982 | Maresca | 528/128 |

FOREIGN PATENT DOCUMENTS

| | | | |
|---|---|---|---|
| 847963 | 7/1970 | Canada | 528/125 |
| 971227 | 9/1964 | United Kingdom | 528/220 |
| 1264900 | 2/1972 | United Kingdom | 528/174 |
| 1414421 | 11/1975 | United Kingdom . | |

OTHER PUBLICATIONS

Poly(arylethers) by Nucleophilic Aromatic Substitution, Johnson et al., Journal of Polymer Science, Part A-1, vol. 5, 2375-2398, (1967).

*Primary Examiner*—Veronica P. Hoke
*Attorney, Agent, or Firm*—Cushman, Darby & Cushman

[57] ABSTRACT

Tough crystalline thermoplastic aromatic polyetherketones containing the repeat units alone or in conjunction with other repeat units especially and having an inherent viscosity IV of at least 0.7, preferably at least 0.8. The polymers may be made by condensation of hydroquinone, 4,4'-difluorobenzophenone and an alkali metal carbonate or bicarbonate in the presence of an aromatic sulphone solvent, e.g. diphenylsulphone, at 150°-400° C. The polymers are very useful for wire coating.

14 Claims, 1 Drawing Sheet

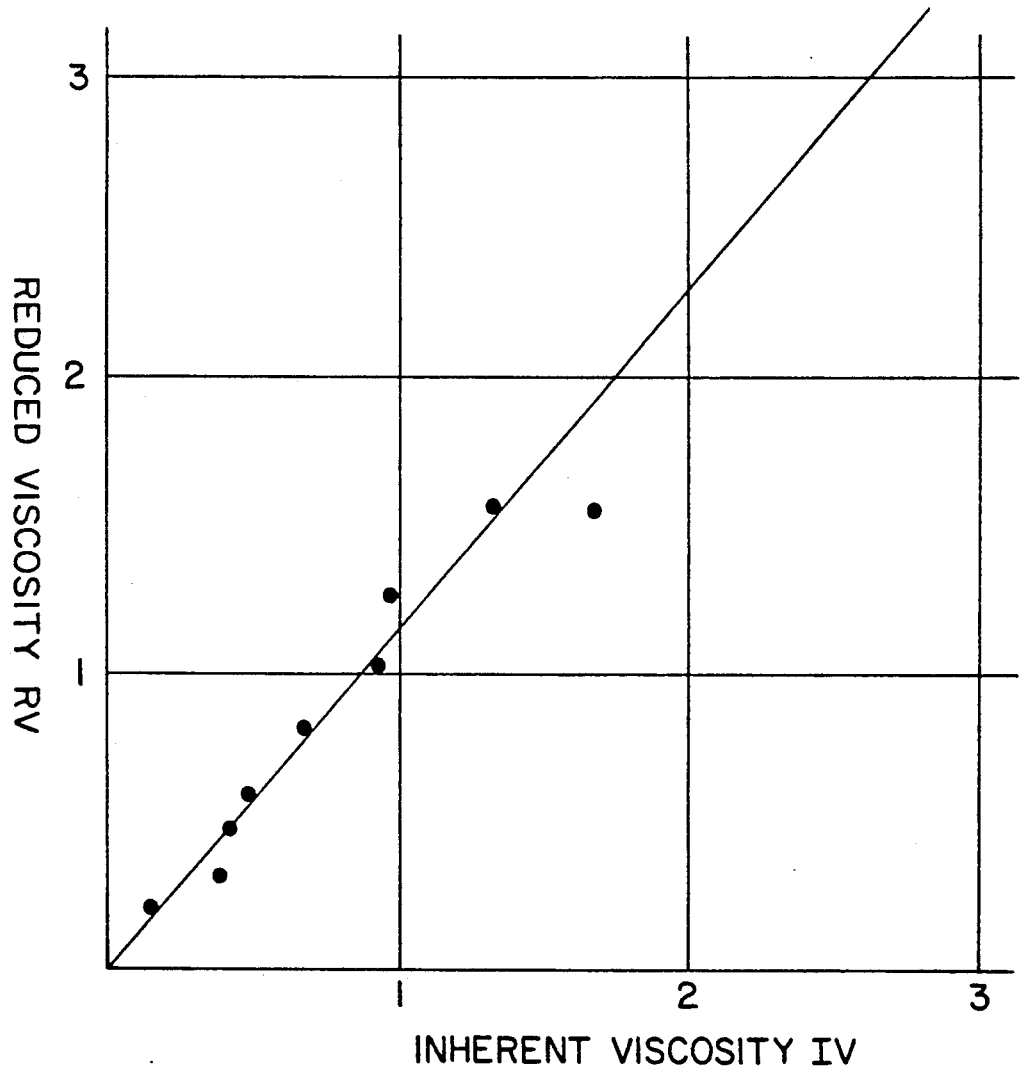
3
2
1
REDUCED VISCOSITY RV
1
2
3
INHERENT VISCOSITY IV

THERMOPLASTIC AROMATIC POLYETHERKETONES

Matter enclosed in heavy brackets [ ] appears in the original patent but forms no part of this reissue specification; matter printed in italics indicates the additions made by reissue.

This application is a continuation-in-part of our application Ser. No. 873 477 filed Jan. 30, 1978 and now abandoned.

This invention relates to certain thermoplastic aromatic polyetherketones. Aromatic polyetherketones, which have the general formula —Ar—O—, where Ar is an aromatic radical and at least some of the Ar radicals contain a ketone linkage, are generally crystalline.

The polymers are of particular use as insulants for, e.g. wire coating, where the polymer is subject to a high service temperature, either continuously or intermittently. For such applications the polymers should not only have a high melting point and retain their mechanical and insulant properties at the desired service temperature, but also should be tough.

According to the present invention there is provided a tough crystalline thermoplastic aromatic polyetherketone containing the repeating unit I

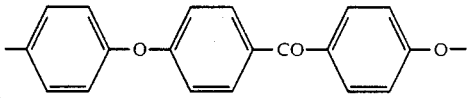

alone or in conjunction with other repeat units, said polymer having an inherent viscosity IV of at least 0.7 (which corresponds to a reduced viscosity RV of at least 0.8). Preferably said polymer has IV of at least 0.8 (which corresponds to RV of at least 0.9).

RV in this specification is measured at 25° C. on a solution of the polymer in concentrated sulphuric acid of density 1.84 $g.cm^{-3}$, said solution containing 1 g of polymer per 100 $cm^3$ of solution the measurement being taken immediately after dissolution is complete to minimise the effect of sulphonation. IV in this specification is measured at 25° C. on a solution of the polymer in concentrated sulphuric acid of density 1.84 $g.cm^{-3}$, said solution containing 0.1 g of polymer per 100 $cm^3$ of solution. (The measurements of both RV and IV both employed a viscometer having a solvent flow time of approximately 2 minutes.) The molecular weights of the polymers according to the present invention as defined and exemplified in the specification accompanying the priority-founding U.K. application Nos. 37345/77 and 1412/78 are specified in terms of RV using a 1% solution in concentrated sulphuric acid. However, as indicated above, RV determined with a 1% solution is a somewhat inconvenient measurement of molecular weight to employ because it needs to be taken immediately after dissolution is complete, the RV value obtained using a 1% solution tending to increase with time due to the effect of sulphonation. Subsequent to this original work, we are now specifying the molecular weights of the polymers of the present invention in terms of IV using a 0.1% solution in concentrated sulphuric acid since we have found that there is no change in the IV values obtained using this lower level of polymer concentration for periods of up to 70 hours. Consequently, we now wish to define the polymers of the invention in terms of IV (0.1% concentration) and this is reflected in the above statement of invention. In order to retain our U.K. priority dates, the molecular weights of most of the polymers of the Examples in the priority-founding applications have been remeasured in terms of IV at 0.1% concentration (see Examples of this specification) and a graphical correlation of RV (1% concentration) with IV (0.1% concentration) has been made—this is set out in the accompanying drawing. It can be seen that the correlation conforms to a reasonably good straight line. Thus, in this specification, molecular weights are now defined in terms of IV (0.1% concentration) values which are intended to correspond directly with the RV (1% concentration) values as specified in the priority-founding U.K. applications. These IV values are taken from the graphical correlations—except where the molecular weight of an individual polymer has been remeasured in terms of IV (as in most of the Examples) where the actual measured value of IV is given.

Tough crystalline aromatic polyetherketones have been described previously, inter alia, in British patent specification No. 1 414 421 where, inter alia, there is described the manufacture of polyetherketones containing the repeating units II

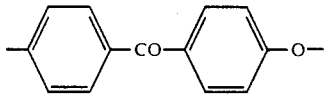

alone or in conjunction with the repeating units III

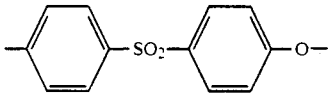

These polymers were made by polycondensation in the presence of an aromatic sulphone of a dialkali metal salt of a bisphenol with an aromatic dihalide in which the halogen atoms were activated by carbonyl groups para thereto. To obtain the polymers with the repeat units II alone or in conjunction with the repeat units III, the dialkali metal salt was a salt of 4,4'-dihydrobenzophenone and the dihalide was 4,4'-dihalobenzophenone alone or in admixture with a 4,4'-dihalodiphenylsulphone. While such polymers made in accordance with the process of British Pat. No. 1 414 421 are tough crystalline polymers, the bisphenol, 4,4'-dihydroxybenzophenone, necessary for their production is relatively expensive.

The polymers of the present invention may be made using the relatively cheap bisphenol, hydroquinone.

Polyetherketones having the repeat units I are described as being crystalline in Table IX of an article by Johnson et al in Journal of Polymer Science Part A-1 Vol 5 (1967) at page 2394. Although no details of the preparation of this polymer are given, the article is concerned with the preparation of polyethers by the condensation of dialkali metal salts of bisphenols with activated dihalides and so it is presumed that the polymer having repeat units I referred to on page 2394 of Table IX was made by such a route, viz from a dialkali metal salt of hydroquinone and a 4,4'-dihalobenzophenone. At page 2378 of the article it is indicated that the solvent employed for the polycondensation reaction should be dimethyl sulphoxide or sulpholane (tetrahydrothiophene 1.1 dioxide). It is also there indicated that when polycondensing hydroquinone and DCDPS (dichlorodiphenylsulphone)—which would give rise to the polyethersulphone analogue of the polymer of repeat unit I—a high molecular weight polymer could not be obtained using dimethyl sulphoxide as the solvent as crystallisation interfered. At page 2391 it is indicated that the polyethersulphones are less crystalline than the benzophenone polyethers and so the polymer of repeat unit I would be expected to be more crystalline than its sulphone analogue. Hence it would be expected that the polymer prepared from hydroquinone and a 4,4'-dihalobenzophenone would be more crystalline than its sulphone analogue and so crystallisation of the polymer during its production would present even more difficulty [i] *in* obtaining a high molecular weight polymer.

We have found that even in sulpholane—which is indicated at page 2378 to be suitable for the hydroquinone-dichlorodiphenylsulphone systems—because of premature crystallisation, it is not possible to obtain polymer from hydroquinone and a 4,4'-dihalobenzophenone that is of high enough molecular weight to render the polymer tough.

We therefore believe that the polymer of repeat unit I in Table IX on page 2394 was of only low molecular weight and hence was brittle. Indeed at page 2391 it is indicated that "the crystallisable polyethers tend to be brittle (unstretched) unless obtained in the amorphous form".

We have found that crystalline polymers containing repeat unit I alone or in conjunction with other repeating units can be made having a sufficiently high molecular weight (IV at least 0.7, which corresponds to RV at least 0.8) that the polymer is tough by polycondensing, under substantially anhydrous conditions, at least one bisphenol which is or includes hydroquinone and at least one aromatic dihalide in which the halogen atoms are activated by —CO— or —$SO_2$— groups ortho or para thereto which at least one dihalide is or includes 4,4'-difluorobenzophenone, there being substantially equimolar amounts of bisphenol and aromatic dihalide, in the presence of sufficient of at least one alkali metal carbonate or bicarbonate such that there is at least 2 gram atoms of alkali metal per mole of bisphenol, the alkali metal or metals being selected from sodium, potassium, rubidium, and caesium provided that the sole use of sodium carbonate and/or bicarbonate is excluded, and in the presence of a solvent having the formula

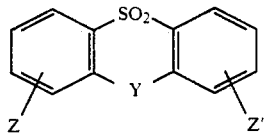

where Y is a direct link, an oxygen atom or two hydrogen atoms (one attached to each benzene ring) and Z and Z' are hydrogen or phenyl groups, within the temperature range 150° to 400° C., preferably 200° to 400° C., the final temperature level during the polycondensation being sufficiently high to maintain the final polymer in solution, such that a polymer having IV of at least 0.7 (which corresponds to RV of at least 0.8) is obtained.

The polymers according to the invention cannot be made using the polycondensation process described in British patent specification No. 1 414 421 i.e. using a dialkali metal salt of hydroquinone in place of the hydroquinone plus alkali metal carbonate or bicarbonate in the presence of the aromatic sulphone since this method results in the formation of a very dark polymer of low molecular weight and high absorbance which is generally brittle.

The test that we have generally used to determine the toughness of a polymer is one which involves compression moulding a thin film (about 0.2 mm thick) from a sample of the polymer at 400° C. in a press (20 tons for 5 minutes), cooling the film slowly using air to induce complete crystallisation (the film being taken out of the released press at 120° C., after about 30 minutes cooling and then being allowed to further cool to room temperature), and then hinging the film through 180° (i.e. so that two faces of the film formed about the hinge touch) followed by hinging through 360° several times (at least 5 times) about the crease so formed (i.e. so that the opposed faces on each side of the film about the hinge touch each other alternately). If the film survives this treatment without breaking (e.g. snapping or tearing) it is deemed to be tough; if not it is deemed to be brittle.

Another measurement that we have used to assess the quality of a polymer is its absorbance in sulphuric acid solution (the solution of the polymer in sulphuric acid being made up at 1% concentration as in the measurement of RV) which gives a measurement of the transparency of the polymer solution at 550 μm. Unlike the measurement of RV at 1% concentration, the absorbance value measured at this concentration does not change with time. [The method used employed a double-beam (reference and sample beams) Unicam SP 500B Ultra-Violet Spectrophotometer and 1 cm path length glass cells. Initially concentrated sulphuric acid (density 1.84 $g.cm^{-3}$) is charged to both the reference and sample cells and the machine zeroed. The sample cell is charged with a solution of the polymer in concentrated sulphuric acid (1 g of polymer per 100 $cm^3$ of solution). The ultra-violet spectrum is then plotted from 600 to 500 μm and the absorbance at 550 μm measured.] Preferably the absorbance should be $\leqq 0.5$, more preferably $\leqq 0.3$, and particularly $\leqq 0.15$. Too high an absorbance can indicate that the polymer contains much chain branching (and may be brittle) or coloured impurities which absorb at 550 μm. Of course a polymer may have a low absorbance but will still not be sufficiently tough unless its IV is at least 0.7.

The hydroquinone may be used with other bisphenols so as to produce copolymers. Likewise the 4,4'-difluorobenzophenone may be used with other dihalides in which the halogen atoms are activated by —$SO_2$— or —CO— groups ortho or, preferably, para thereto.

Other bisphenols that may be used with the hydroquinone include bisphenols of formula

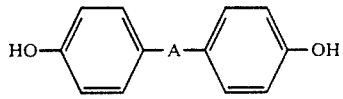

in which A is a direct link, oxygen, sulphur, —$SO_2$—, —CO—, or a divalent hydrocarbon radical. Examples of such bisphenols are 4,4'-dihydroxybenzophenone 4,4'-dihydroxydiphenylsulphone 2,2'-bis(4-hydroxyphenyl)propane 4,4'-dihydroxybiphenyl.

Other dihalides that may be used with the 4,4'-difluorobenzophenone include dihalides having the formula

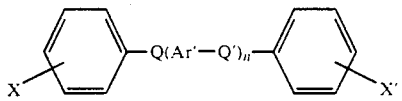

in which X and X', which may the same or different, are halogen atoms and are ortho or para—preferably the latter—to the groups Q and Q'; Q and Q', which may be the same or different, are —CO— or —$SO_2$—; Ar' is a divalent aromatic radical; and n is 0, 1, 2 or 3.

The aromatic radical Ar' is preferably a divalent aromatic radical selected from phenylene, biphenylylene or terphenylylene.

Particularly preferred dihalides have the formula

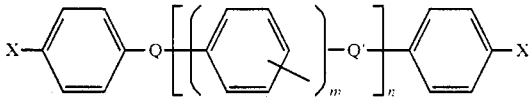

where m is 1, 2 or 3.

Examples of such dihalides include 4,4'-dichlorodiphenylsulphone 4,4'-difluorodiphenylsulphone 4,4'-dichlorobenzophenone bis-4,4'-(4-chlorophenylsulphonyl)biphenyl bis-1,4-(4-chlorobenzoyl)benzene bis-1,4-(4-fluorobenzoyl)benzene 4-chloro-4'-fluorobenzophenone 4,4'-bis-(4-fluorobenzoyl)biphenyl 4,4'-bis-(4-chlorobenzoyl)biphenyl.

It has been found that while the above reaction does not proceed to give a tough crystalline polymer if all the 4,4'-difluorobenzophenone is replaced by the corresponding dichloro compound, 4,4'-dichlorobenzophenone, or by 4-chloro-4'-fluorobenzophenone, a proportion of the difluoro compound may be replaced without adverse effects, and with consequent cost advantage, by the dichloro or chloro-fluoro compounds.

Where a cocondensant or cocondensants are employed that would give rise to repeat units other than units I, i.e. when using bisphenols other than hydroquinone and/or dihalides other than 4,4'-difluorobenzophenone, [4chloro]*4-chloro*-4'-fluorobenzophenone or 4,4'-dichlorobenzophenone, the amount of such cocondensant or cocondensants employed should be such that ≦50 mole % of the total amount of bisphenol and/or aromatic dihalide should consist of such cocondensant or cocondensants.

The polymers resulting from the use of the preferred bisphenol cocondensants recited above will contain, in addition to the repeat units I, repeat units IV

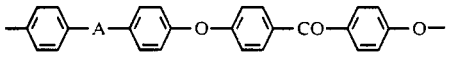

while the polymers resulting from the use of the preferred dihalide cocondensants recited above (other than the chloro-fluoro or dichloro benzophenone) will contain, in addition to the repeat units I, repeat units V

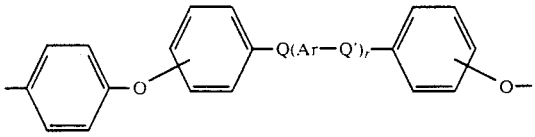

in which the oxygen atoms in the sub-units

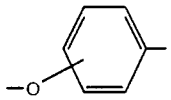

are ortho or para to the groups Q and Q'.

Where both bisphenol and dihalide (other than the chloro-fluoro or dichloro benzophenone) cocondensants are employed, the polymers will contain, in addition to the repeat units I, IV and V, the repeat units VI

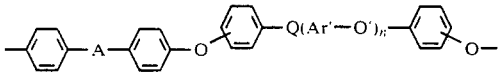

It is preferred that the amount of cocondensant(s) employed is such that the polymer contains at least 50 mole %, often at least 70 mole %, of repeat units I.

If a bisphenol cocondensants is employed it is preferably 4,4'-dihydroxybenzophenone and is preferably used without a dihalide cocondensant so as to yield a copolymer containing the repeat units I together with the repeat units IX

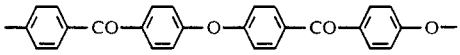

(In effect, IX is an alternative way of writing the repeat unit II.)

The copolymers containing repeat units I and IX are exceptionally useful and interesting products. Thus a copolymer made from approximately equimolar amounts of hydroquinone and 4,4'-dihydroxybenzophenone, plus 4,4'-difluorobenzophenone (in twice the molar amount of hydroquinone) has been found to have a glass transition temperature (Tg) of 154° C. and melting point (Tm) of 345° C. The homopolymer of repeat unit I according to the invention has typically been found to have Tg of 140° C. and Tm of 334° C. while the homopolymer of repeat unit IX has typically been found to have Tg of 154° C. and Tm of 365° C. Thus, quite unexpectedly, the copolymer containing repeat units I and IX retains the higher Tg derived from the units IX while at the same time possessing a Tm between those of the homopolymers of I and IX as might have been expected. This is very useful from a practical viewpoint because it enables a copolymer according to the invention to be made possessing the useful higher Tg equal to that of the homopolymer IX (mechanical properties tend to deteriorate near or above Tg) while still possessing a lower Tm than that of the homopolymer IX (and hence being more easily processable).

It is also preferred that if a dihalide cocondensant is employed it is 4,4'-dihalodiphenylsulphone and is used without a bisphenol cocondensant. The resultant polymers will then contain repeat units I together with the repeat units VIII

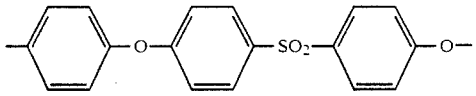

The polycondensation reaction is conducted in a solvent of formula

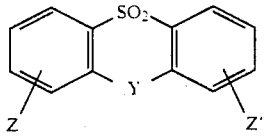

where Y is a direct link, an oxygen atom or two hydrogen atoms (one attached to each benzene ring) and Z and Z', which may be the same or different, are hydrogen atoms or phenyl groups. Examples of such aromatic sulphones include diphenylsulphone, dibenzothiophen dioxide, phenoxathiin dioxide and 4-phenylsulphonyl biphenyl. Diphenylsulphone is the preferred solvent.

The condensation is carried out at temperatures between 150° C. and 400° C. Initially the temperature should be kept low to avoid loss of hydroquinone which is rather volatile and to minimise possible side reactions involving the hydroquinone. The temperature is raised in stages or continuously to a level such that the final polymer is in solution at any intermediate stage and indeed this can serve as an indication that the full extent of the reaction has occurred at that temperature. When the polymer consists wholly of repeat units I, the final temperatures reached is preferably in the vicinity of 320° C.

The polycondensation is conducted using the at least one alkali metal carbonate or bicarbonate as defined. The at least one alkali metal carbonate or bicarbonate is preferably selected from sodium carbonate, sodium bicarbonate, rubidium carbonate and caesium carbonate. The at least one alkali metal carbonate or bicarbonate may be a single carbonate or bicarbonate except where the alkali metal is sodium. The use of sodium carbonate or bicarbonate alone is excluded because such use results in the formation of a brittle polymer of low molecular weight IV<0.7 and poor colour (e.g. dark grey). Mixtures of alkali metal carbonates and/or bicarbonates may advantageously be employed as well. In particular it may be advantageous to use a major amount of a carbonate or bicarbonate of sodium in admixture with a minor amount of a carbonate or bicarbonate of an alkali metal of higher atomic number as the polymer properties are improved in comparison to when sodium or potassium (or higher alkali metal) carbonate or bicarbonate is used alone.

Thus the use of a mixture of sodium carbonate or bicarbonate with a very small amount of a carbonate or bicarbonate of a higher alkali metal provides a tough polymer of high molecular weight (IV at least 0.7) and good colour (white or off-white) (in contrast to the polymer described above made using sodium carbonate or bicarbonate alone).

The use of a mixture of sodium carbonate or bicarbonate with a very small amount of a carbonate or bicarbonate of a higher alkali metal is also advantageous in comparison to the use of potassium (or higher alkali metal) carbonate or bicarbonate alone. Thus, while the use of potassium (or higher alkali metal) carbonate or bicarbonate alone yields a tough polymer of IV at least 0.7 and good colour (and so is within the scope of the present invention), we have found that if the polycondensation is carried out on a scale larger than a small laboratory-scale, then an undesirably high gel content (i.e. material which becomes swollen by but does not dissolve in sulphuric acid) in the polymer may sometimes be obtained; also the reaction vessel if made of stainless steel becomes discoloured with a dark coating which must be removed before the next polymerisation in the vessel. The use of a mixture of sodium and potassium (or higher alkali metal) carbonates or bicarbonates provides a polymer of little or no gel content and does not incur discolouration of a stainless steel reaction vessel when polycondensation is carried out on a large scale. The use of such a mixture is additionally advantageous in that sodium carbonate (or bicarbonate) is less expensive in our experience than the carbonates (or bicarbonates) of higher alkali metals and is required in a smaller amount by weight to produce an equivalent concentration of alkali metal on account of its lower molecular weight.

The amount of higher alkali metal carbonate or bicarbonate in the mixture is preferably such that there are 0.001 to 0.2, preferably 0.005 to 0.1 gram atoms of the higher alkali metal per gram atom or sodium. Particularly effective combinations include sodium carbonate or bicarbonate in admixture with potassium or caesium carbonates. Sodium carbonate in admixture with potassium carbonate is most preferred.

The total amount of alkali metal carbonate or bicarbonate employed should be such that there is at least 2 gram atoms of alkali metal per mole of bisphenol i.e. at least 1 atom of alkali metal for each phenol group. An amount less than this (even a very slight deficiency) has been found to result in a brittle polymer of poor colour which is not according to the invention. Thus when using alkali metal carbonate there should be at least 1 mole of carbonate per mole of bisphenol and when using alkali metal bicarbonate there should be at least 2 moles of bicarbonate per mole of bisphenol. Too great an excess of carbonate or bicarbonate should not be used however in order to avoid deletertious side reactions; preferably there is between 1 and 1.2 atoms of alkali metal per phenol group.

The molecular weight of the polymer should be such that its IV is at least 0.7 (RV at least 0.8), and preferably its IV is at least 0.8 (RV at least 0.9). Polymers of IV lower than 0.7 are brittle and not according to the invention. It is preferred that the polymers have IV≦2.6 (RV<3.0), preferably IV≦1.8 (RV≦2.0), since those polymers of IV>2.6 (sometimes>1.8) are not generally useful as their melt viscosity is too high for adequate processability.

The molecular weight of the polymer may be controlled by the use of a slight excess over equimolar of one of the dihalide or bisphenol reactants. Preferably a slight excess, e.g. up to 5 mole %, of dihalide is used as this results in the favoured formation of halide end groups rather than phenate end groups thereby providing a polymer of greater thermal stability. Alternatively the polycondensation may be terminated when the molecular weight has reached the desired level.

The polyetherketones of the present invention possess excellent mechanical and electrical properties, coupled with outstanding thermal and combustion characteristics. They also show resistance to an extremely wide range of solvents and proprietary fluid (they appear to dissolve only in conc. sulphuric acid). They are thus very suitable for use in applications where the service conditions are too demanding for the more established engineering plastics and in particular where the polymers are liable to high service temperatures. They may be fabricated into any desired shape, e.g. mouldings, coatings, films or fibres. They are particularly advantageous when used as electrical insulation for electrical conductors (and in particular as insulating coatings for wires and cables) in that they exhibit high resistance to attack by solvents, particularly polar solvents such as alcohols like isopropanol, exhibit an excellent surface gloss on extrusion, and exhibit high resistance to heat stress embrittlement (embodied in the ability of electrical wire insulated by a coating of the polymer, which wire has been twisted about itself, to withstand cracking of the insulation at an elevated temperature).

The invention is illustrated by the following Examples.

EXAMPLE 1

4,4'-difluorobenzophenone (21.82 g. 0.10 M), hydroquinone (11.01 g. 0.10 M) and diphenylsulphone (60 g) were charged to a 3-necked glass flask equipped with a stirrer, nitrogen inlet and an air condenser. These materials were heated with stirring to 180° C. to form a nearly colourless solution and, while maintaining a nitrogen blanket, anhydrous potassium carbonate (14.9 g. 0.101 M sieved through a 300 μm sieve) was added. The temperature was raised to 200° C. and maintained there for 1 hour; the temperature was then raised to 250° C. and maintained there for 1 hour, finally the temperature was raised to 320° C. and maintained there for 1 hour the resulting polymer being in solution at this stage. The mixture was cooled (without end stopping) and the resulting solid reaction product was milled so as to pass through a 500 μm sieve. Diphenylsulphone and inorganic salts were removed by washing successively with acetone (twice), water (thrice), and acetone/methanol (twice).

The resulting solid polymer was dried at 140° C. under vacuum. The polymer which consisted of the repeat unit

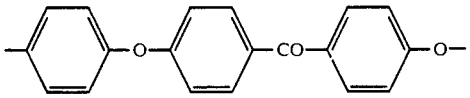

had a molecular weight corresponding to RV of 1.55, (which corresponds to IV of about 1.4 from the graphical correlation) an absorbence of 0.07 and contained no gel.

A film, compression moulded from the polymer at 400° C. (as described hereinbefore), was extremely tough, easily surviving the hinging toughness test described hereinbefore, and almost white in colour; the polymer was found to be stable in the melt at 400° C. for over 1 hour. The polymer had a melting point of 334° C. and a glass transition temperature of about 140° C. using the method of differential scanning calorimetry.

EXAMPLE 2

A copolymer containing the repeat units

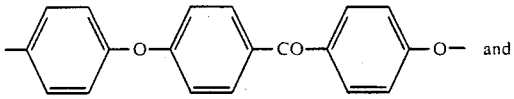

and

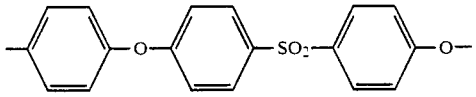

was prepared using the procedure of Example 1, the initial reaction charge consisting of 4,4'-difluorobenzophenone (17.46 g, 0.08 M), 4,4'-dichlorodiphenylsulphone (5.74 g, 0.02 M), hydroquinone (11.01 g, 0.10 M) and diphenylsulphone (60 g).

The copolymer had molecular weight corresponding to RV of 1.27 (remeasured as IV of 0.98), absorbance 0.12, contained no gel, was tough on the hinging test and was melt stable at 400° C. for over 1 hour.

EXAMPLE 3

4,4'-difluorobenzophenone (21.82 g, 0.10 M), hydroquinone (11.01 g, 0.10 M), and diphenylsulphone (60 g) were charged to a 3-necked flask equipped with a stirrer, nitrogen inlet and air condenser as in Example 1. These materials were heated with stirring to 180° C. to form a neary colourless solution and, while maintaining a nitrogen blanket, anhydrous sodium carbonate sieved through a 500 μm sieve (10.7 g, 0.101 M) was added. The temperature was raised to 200° C. and maintained there for 1 hour; the temperature was then raised to 250° C. and maintained there for 15 minutes; finally the temperature was raised to 320° C. and maintained there for 2.5 hours, the resulting polymer being in solution.

The reaction mixture, which had become rather dark, was cooled (without end-stopping) and the resulting solid reaction product milled so as to pass through a 500 μm sieve. Diphenylsulphone and inorganic salts were removed by washing successively with acetone (twice), water (thrice), and acetone/methanol (twice).

The resulting solid polymer was dried at 140° C. under vacuum. The polymer which consisted of the repeat units

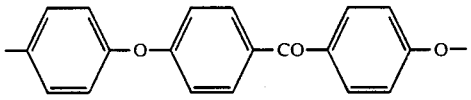

had molecular weight corresponding to RV of 0.60 (remeasured as IV of 0.48) and an absorbance of 0.20.

Films, compression moulded from the polymer at 400° C. (as described hereinbefore), were brittle (the film snapped on the initial hinging through 180°) and dark grey in colour.

EXAMPLE 4

Polymer was prepared in a manner similar to that of Example 3 except that the polycondensation was carried out on a larger scale and in a stainless steel reactor and using potassium carbonate instead of sodium carbonate, the quantities of materials used being as follows: 4,4'-difluorobenzophenone (4364 g, 20.0 M), hydroquinone (2202 g, 20.0 M), diphenylsulphone (1200 g) and anhydrous potassium carbonate (2792 g, 20.2 M) (added as in the technique of Example 3).

The resulting polymer in this case had molecular weight corresponding to RV of 1.55 (remeasured as IV of 1.68), an absorbance of 0.13 and yielded films (compression moulded at 400° C. from the polymers as described hereinbefore) which were tough on the hinging test and which were lighter in colour than those made from the polymer of Example 3. Nevertheless, the polymer contained a quantity of gel and the reaction vessel had acquired a black coating.

EXAMPLE 5

Polymer was prepared in a manner similar to that of Example 4 except that a mixture of anhydrous sodium carbonate (2056 g, 19.4 M) and anhydrous potassium carbonate (138 g, 1.0 M) was used in place of the anhydrous potassium carbonate (2792 g, 20.2 M) used in Example 4.

The resulting polymer had molecular weight corresponding to RV of 1.55 (remeasured as IV of 1.32) an absorbance of 0.14 and gave tough (on the hinging test) off-white film. In this case there was no gel present in the polymer and the reaction vessel had not become discoloured.

EXAMPLE 6

Polymer was made as in Example 1 except that a stoichiometric deficiency (less than 1 atom of alkali metal per phenol group) of potassium carbonate was employed, the amount of potassium carbonate used being 13.68 g, 0.099 M instead of 14.0 g, 0.101 M as in Example 1. Also the temperature was maintained at 250° C. for 15, minutes (and not 1 as our in Example 1) and at 320° C. for 40 hours 20 minutes (and not 2.5 hours as in Example 1).

The resulting polymer had molecular weight corresponding to RV of 0.32 (remeasured as IV of 0.38), an absorbance of 0.38 and yielded brittle film (on the hinging test) of poor colour.

EXAMPLE 7

In this Example an attempt was made to make the polymer of the present invention using the process of the article (discussed hereinbefore) by Johnson et al in Journal of Polymer Science Part A-1 Vol 5 (1967) under the most favourable conditions.

To a 3-necked flask was charged hydroquinone (4.404 g, 0.040 M), aqueous potassium hydroxide (9.224 g, 0.080 M), sulpholane (20.0 g) and xylene (25 ml). The flask was placed in an oil bath at 200° C. and stirred overnight under nitrogen to effect dehydration. 4,4'-difluorobenzophenone (8.928 g, 0.040 M) was added dissolved in xylene and the bath temperature was raised to 240° C. and maintained there for 1 hour. The temperature was then raised over a period of 1 hour to 275° C. and held there for 4 hours. The reaction mass was then a thick off-white paste. The paste was cooled and broken up in methanol (500 ml), collected by filtration and washed successively with boiling methanol, water (twice) and methanol/acetone (twice). The grey powder was dried at 120° C. under vacuum.

The polymer had molecular weight corresponding to RV of 0.45 (which corresponds to IV of about 0.4 from the graphical correlation) and when moulded at 400° C. (using the method described hereinbefore) gave a very brittle film (hinging test) having a brown colour.

This result shows that the method indicated in the above-mentioned prior art for making a polymer of repeat unit

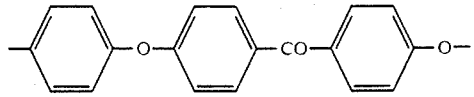

fails to yield a polymer according to the present invention, even under the most favourable conditions there implied (using sulpholane), the product instead being a very brittle polymer of low molecular weight and poor colour.

EXAMPLES 8 to 12

In these Examples, the procedure adopted was that of Example 1 (using the same materials and the same amounts) except that the period of heating at 250° C. was for 15 minutes (not 1 hour) and during the heating at 320° C. the reaction mixture was sampled after 15 minutes (Example 8), 30 minutes (Example 9) and 45 minutes (Example 10). After 1 hour at 320° C., the mixture was cooled (without end stopping) and the polymer worked up as in Example 1 (Example 11). The samples were also worked up as for Example 1.

The properties of the polymer samples and the final polymer were found to be as follows:

| Example No. | Molecular weight: Measured as RV | Molecular weight: Remeasured as IV | Absorbance | Toughness of moulded film (hinging test) |
|---|---|---|---|---|
| 8 | 0.21 | 0.15 | 0.10 | Brittle |
| 9 | 0.47 | 0.42 | 0.10 | Brittle |
| 10 | 0.82 | 0.67 | 0.12 | Borderline of toughness* |
| 11 | 1.02 | 0.93 | 0.12 | Tough |

*some parts of the film surviving test but other parts failing

The borderline for toughness is thus found to correspond to an RV of 0.8 or IV of 0.7.

Several other experiments (Example 12) have shown that an RV of about 0.9 (IV of about 1.0) consistently corresponds to tough polymer (Over the borderline for toughness).

EXAMPLE 13

In this Example an attempt was made to prepare the polymer of the present invention using the process described in British patent specification No. 1 414 421 i.e. using the dipotassium salt of hydroquinone (in place of the hydroquinone plus alkali metal carbonate or bicarbonate) in the presence of aromatic sulphone.

This preparation proved to be very complicated and laborious on account of the extreme sensitivity of the dipotassium salt of hydroquinone (KOPhOK) to the oxygen in air and hence the necessity to carry out its preparation and reaction under nitrogen with the rigorous exclusion of any air.

An apparatus was set up comprising two 100 ml dropping funnels one upon the other (the bottom one being balanced), the outlet of the top funnel being connectable to the top of the bottom funnel via an air-tight ground glass joint. Both funnels were capable of being rendered air-tight and could receive a blanketing sweep of nitrogen. The bottom funnel was connectable via a flexible tube to a rotary evaporator having a pear-shaped 500 ml evaporator flask, also capable of being swept with a blanketing sweep of nitrogen. The top funnel was approximately ¾ filled with distilled water, the bottom funnel was approximately ½ filled with a solution of KOH (0.50 mole) in water, and the rotary evaporator flask contained hydroquinone (0.25 mole, 27.53 g) slurried in a little water. The contents of both dropping funnels were purged with nitrogen overnight as were the contents of the rotary evaporator.

With the evaporation flask rotating, the aqueous KOH solution in the bottom funnel was added to the aqueous slurry of hydroquinone to form a pale yellow solution. The bottom funnel and the lines between it and the rotary evaporator were then washed thoroughly with distilled water from the top funnel (4×15 ml). The aqueous KOPhOK solution was then rotary evaporated to dryness over 3 hours (the bath temperature for the receiver flask being 100° C. over the last 2 hours). The flask and its contents were cooled and transferred to a nitrogen-purged "dry-box" where the salt was scraped from the flask walls and other parts of the apparatus, and the flask scrapings comminuted to pass through a 300 μm sieve, and transferred to a screw-cap bottle stored inside the dry-box. The purity of KOPhOK was estimated to be 85.8% (the total weight of salt collected being 54.28 g); it was pale yellow-green in colour. A small sample of the salt was exposed to the air whereupon it instantly became bright blue and then black over several minutes.

A portion of the KOPhOK (22.16 g, 0.102 mole taking into account 85.8% purity) was transferred to a 250 ml 3-necked glask in the dry-box, 4,4'-difluorobenzophenone (22.38 g, 0.103 mole) and 30 g diphenylsulphone were weighed into a flask A and 31.16 g diphenylsulphone weighed into another flask B, both flasks being purged with nitrogen overnight and transferred to the dry box. The contents of flask A were added to the flask containing the KOPhOK, and all the diphenylsulphone of flask B used to "solid-wash" any residual 4,4'-difluorobenzophenone in flask A into the flask containing the KOPhOK.

The flask containing all the reactants was then removed from the dry-box, fitted with a nitrogen sweep system, condenser and stirrer. The reagents were thoroughly mixed and then heated with stirring to 180° C. to form a brown paste and than a sticky brown layer (mainly on the flask walls and stirrer) in an almost water white melt. The temperature was then raised to 200° C. and maintained there for 1 hour (during which water distilled off). The mixture gradually became orange brown and the sticky layer mainly on the stirrer and flask walls began to disappear. The temperature was raised to 240° C. and maintained there for 1 hour; the temperature was then raised to 280° C. and maintained there for 1 hour; finally the temperature was raised to 320° C. and maintained there for 3 hours (by which time the reaction mixture was almost black), a further 0.44 g of 4,4'-difluorobenzophenone having been added after 2 hours at this temperature. The mixture was cooled and the resulting solid reaction product broken up and milled. Diphenyl-sulphone and inorganic salts were removed by washing with acetone (twice), water (four times) and water/methanol (once).

The resulting solid polymer was dried at 150° C. under vacuum. The polymer had poor colour (grey with insoluble black portions) and had a molecular weight corresponding to IV of 0.40.

This result shows that the method of British patent 1 414 421 when adapted to make a polymer of repeat unit

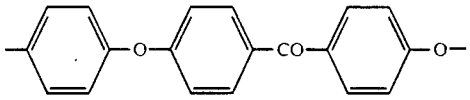

fails to yield a polymer according to the present invention, even when undertaking the laborious and complex conditions necessary to handle the exceptionally air-sensitive disalt starting material.

EXAMPLE 14

A copolymer containing the repeat units

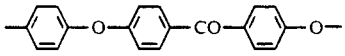

and

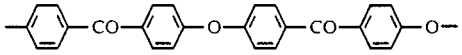

was prepared using the basic procedure of Example 1, the initial charge consisting of 4,4'-difluorobenzophenone (44.08 g, 0.202 mole), hydroquinone (11.01 g, 0.100 mole), 4,4'-dihydroxybenzophenone (21.42 g, 0.100 mole) and diphenylsulphone (160 g). After heating the mixture to 180° C. under a nitrogen blanket, anhydrous sodium carbonate (21.20 g, 0.200 mole) and anhydrous potassium carbonate (0.55 g, 0.004 mole) were added. The temperature was raised to 200° C. and maintained there for 1 hour, the temperature was then raised to 250° C. and maintained there for 15 minutes; finally the temperature was raised to 330° C. and maintained there for 1.5 hours, the resulting polymer being in solution. The reaction was end stopped with 0.44 g 4,4'-difluorobenzophenone and the mixture cooled and worked up.

The resulting copolymer had a molecular weight corresponding to IV of 1.45. It had a melting point of 345° C. and a glass transition temperature of 154° C. X-ray analysis showed that the copolymer had a co-crystalline structure.

We claim:

1. A tough crystalline thermoplastic aromatic polyetherketone containing the repeat unit I

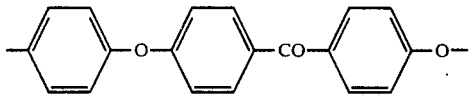

alone or in conjunction with other repeating units selected from the group consisting of the repeating units IV

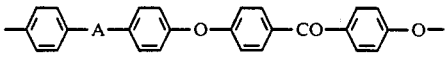

the repeat units V

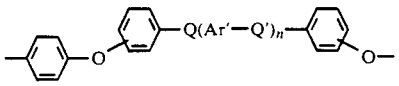

-continued and the repeat units VI

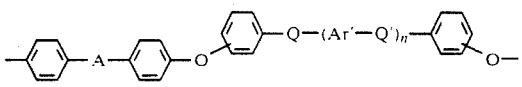

where A is a direct link, oxygen, sulphur, $—SO_2—$, —CO—, or a divalent hydrocarbon radical, the oxygen atoms in the sub-units

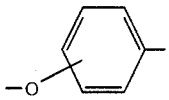

are ortho or para to the groups Q and Q', Q and Q' which may be the same or different are —CO— or $—SO_2—$, Ar' is a divalent aromatic radical, and n is 0, 1, 2 or 3, said polymer having an inherent viscosity IV, as measured at 25° C. on a solution of the polymer in concentrated sulphuric acid of density 1.84 g.cm$^3$ said solution containing 0.1 g of polymer in 100 cm$^3$ of solution, of at least 0.7 (which corresponds to a reduced viscosity RV, as measured at 25° C. on a solution of the polymer in concentrated sulphuric acid of density 1.84 g.cm$^3$ said solution containing 1 g of polymer in 100 cm$^3$ of solution, of at least 0.8.

2. A polyetherketone according to claim 1 having IV of at least 0.8 (which corresponds to RV of at least 0.9).

3. A polyetherketone according to claim 1 which contains only repeating units I and repeating units IX

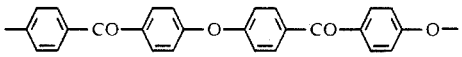

4. A polyetherketone according to claim 1 which contains only repeating units I and repeating units VIII

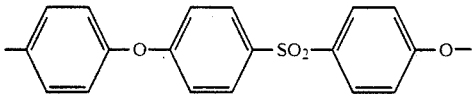

[5. A process for the production of a tough crystalline thermoplastic polyetherketone containing the repeat unit I

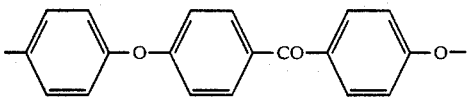

alone or in conjunction with other repeating units selected from the group consisting of the repeating units IV

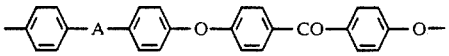

the repeat units V

-continued

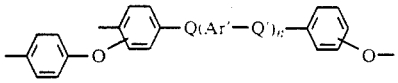

and the repeat units VI

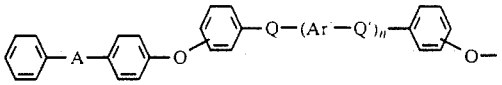

where A is a direct link, oxygen, sulphur, $—SO_2—$, —CO—, or a divalent hydrocarbon radical, the oxygen atoms in the sub-units

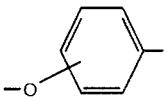

are ortho or para to the groups Q and Q', Q and Q' which may be the same or different are —CO— or $—SO_2—$, Ar' is a divalent aromatic radical, and n is 0, 1, 2 or 3, which process comprises polycondensing, under substantially anhydrous conditions, at least one bisphenol which is hydroquinone or hydroquinone and at least one other bisphenol of formula

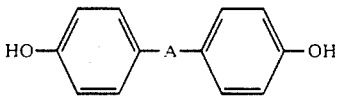

where A is as defined above and at least one aromatic dihalide which is 4,4'-difluorobenzophenone or 4,4'-difluorobenzophenone and at least one other aromatic dihalide of formula

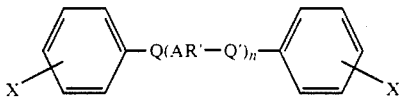

where X and X' which may be the same or different are halogen atoms and are ortho or para to the groups Q and Q', and Q, Q', Ar' and n are as defined above, there being substantially equimolar amounts of bisphenol and aromatic dihalide, in the presence of at least one alkali metal carbonate or bicarbonate used in an amount providing at least 2 gram atoms of alkali metal per mole of bisphenol, the alkali metal or metals being selected from sodium, potassium, rubidium, and caseium provided that the sole use of sodium carbonate and/or bicarbonate is excluded, and in the presence of a solvent having the formula

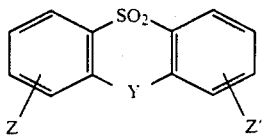

where Y is a direct link, an oxygen atom or two hydrogen atoms (one attached to each benzene ring) and Z and Z' are hydrogen or phenyl groups, within the temperature range 150° to 140° C., the final temperature level during the polycondensation being sufficiently high to maintain the final polymer in solution, such that a polymer having IV of at least 0.7 (which corresponds to RV of at least 0.8) is obtained.]

6. A process according to claim [5] *12* wherein the solvent is diphenylsulphone.

7. A process according to claim [5] *12* wherein the monomers for the polycondensation are solely hydroquinone and 4,4'-difluorobenzophenone.

8. A process according to claim [5] *12* wherein said at least one alkali metal carbonate or bicarbonate is a mixture of sodium carbonate or bicarbonate with a carbonate or bicarbonate of an alkali metal of higher atomic number, the amount of higher alkali metal carbonate or bicarbonate being such that there are 0.001 to 0.2 gram atoms of the higher alkali metal per gram atom of sodium.

9. A process according to claim 8 wherein said at least one alkali metal carbonate is a mixture of sodium carbonate with potassium carbonate.

[10. A fabricated structure comprising a tough crystalline thermoplastic polyetherketone containing the repeat unit I

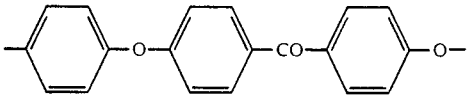

alone or in conjunction with other repeating units selected from the groups consisting of the repeating units IV

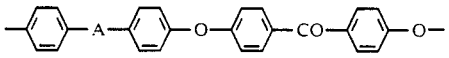

the repeat units V

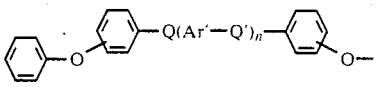

and the repeat units VI

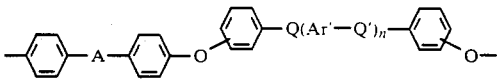

where A is a direct link, oxygen, sulphur, —$SO_2$—, —CO—, or a divalent hydrocarbon radical, the oxygen atoms in the sub-units

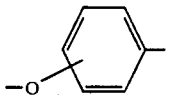

are ortho or para to the groups Q and Q', Q and Q' which may be the same or different are —CO— or —$SO_2$—, Ar' is a divalent aromatic radical, and n is 0, 1, 2 or 3, said polymer having IV of at least 0.7 (corresponding to RV of at least 0.8).]

11. A fabricated structure according to claim [10] *13* in the form of electrical insulation.

*12. A process for the production of a tough crystalline thermoplastic polyetherketone containing the repeat unit I*

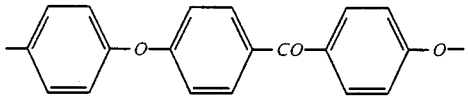

*alone or in conjunction with other repeating units selected from the group consisting of the repeating units IV*

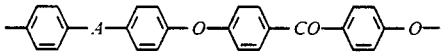

*the repeat units V*

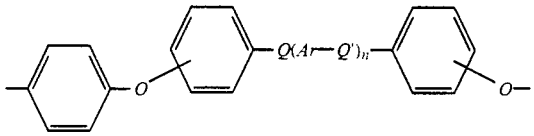

*and the repeat units VI*

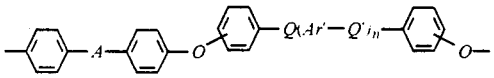

*where A is a direct link, oxygen, sulphur, —$SO_2$—, —CO—, or a divalent hydrocarbon radical, the oxygen atoms in the sub-units*

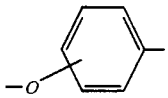

*are ortho or para to the groups Q and Q', Q and Q' which may be the same or different are —CO— or —$SO_2$—, Ar' is a divalent aromatic radical, and n is 0, 1, 2 or 3, which process comprises polycondensing, under substantially anhydrous conditions, at least one bisphenol which is hydroquinone or hydroquinone and at least one other bisphenol of formula*

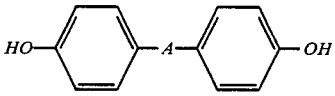

*where A is as defined above and at least one aromatic dihalide which is 4,4'-difluorobenzophenone or 4,4'-difluorobenzophenone and at least one other aromatic dihalide of formula*

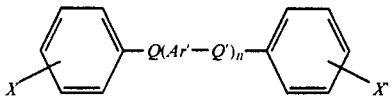

*where X and X' which may be the same or different are halogen atoms and are ortho or para to the groups Q and*

*Q', and Q. Ar' and n are as defined above, there being substantially equimolar amounts of bisphenol and aromatic dihalide, in the presence of at least one alkali metal carbonate or bicarbonate used in an amount providing at least 2 gram atoms of alkali metal per mole of bisphenol, the alkali metal or metals being selected from sodium, potassium, rubidium, and caesium provided that the sole use of sodium carbonate and/or bicarbonate is excluded, and in the presence of a solvent having the formula*

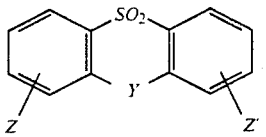

*where Y is a direct link, an oxygen atom or two hydrogen atoms (one attached to each benzene ring) and Z and Z' are hydrogen or phenyl groups, within the temperature range 150° C. to 400° C., the final temperature level during the polycondensation being sufficiently high to maintain the final polymer in solution, such that a polymer having IV of at least 0.7 (which corresponds to RV of at least 0.8) is obtained.*

*13. A fabricated structure comprising a tough crystalline thermoplastic polyetherketone containing the repeat unit I*

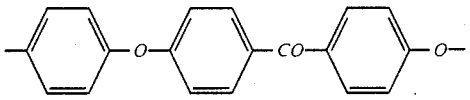

*alone or in conjunction with other repeating units selected from the groups consisting of the repeating units IV*

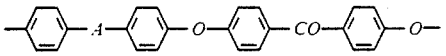

*the repeat units V*

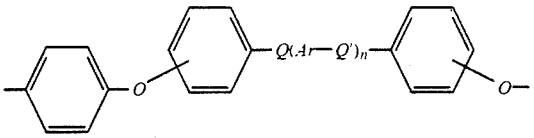

*and the repeat units VI*

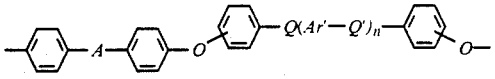

*where A is a direct link, oxygen, sulphur, —$SO_2$—, —CO—, or a divalent hydrocarbon radical, the oxygen atoms in the sub-units*

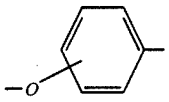

*are ortho or para to the groups Q and Q', Q and Q' which may be the same or different are —CO— or —$SO_2$—, Ar' is a divalent aromatic radical, and n is 0, 1, 2 or 3, said polymer having IV of at least 0.7 (corresponding to RV of at least 0.8).*

*14. A tough crystalline thermoplastic aromatic polyetherketone consisting essentially of the repeat unit I*

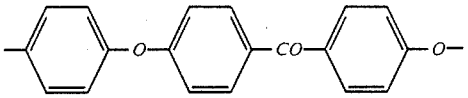

*alone or in conjunction with at most 50 mole %, based on the total repeating units, of other repeating units selected from the group consisting of the repeating units IV*

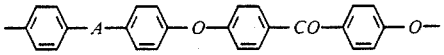

*the repeat units V*

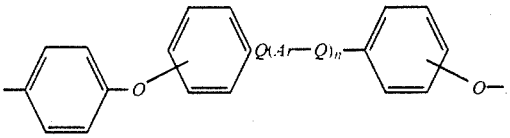

*and the repeat units VI*

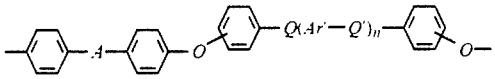

*divalent hydrocarbon radical, the oxygen atoms in the subunits*

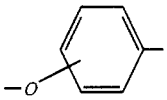

*are ortho or para to the groups Q and Q', Q and Q' which may be the same or different are —CO— or —$SO_2$—, Ar' is a divalent aromatic radical, and n is 0, 1, 2 or 3, said polymer having an inherent viscosity IV, as measured at 25° C. on a solution of the polymer in concentrated sulphuric acid of density 1.84 g.cm$^3$ said solution containing 0.1 g of polymer in 100 cm$^3$ of solution, of at least 0.7 (which corresponds to a reduced viscosity RV, as measured at 25° C. on a solution of the polymer in concentrated sulphuric acid of density 1.84 g.cm$^3$ of solution, of at least 0.8) said solution containing 1 g of polymer in 100 cm$^3$.*

*15. A process for the production of a tough crystalline thermoplastic polyetherketone which process comprises polycondensing, under substantially anhydrous conditions, at least one bisphenol which is hydroquinone or hydroquinone and at least one other co-condensate bisphenol of the formula*

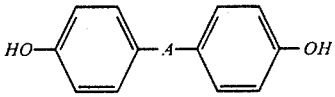

*where A is a direct link, oxygen, sulphur, —$SO_2$—, —CO—, or a divalent hydrocarbon radical, and at least one aromatic dihalide which is 4,4'-difluorobenzophenone or 4,4'-difluorobenzophenone and at least one co-condensate aromatic dihalide of formula*

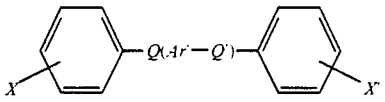

*where X and X' which may be the same or different are halogen atoms and are ortho or para to the groups Q and Q', Q and Q, which may be the same or different are —CO— or —$SO_2$—, Ar' is a divalent aromatic radical at most 50 mole % of the total amount of bisphenol and/or aromatic dihalide being said co-condensates, there being substantially equimolar amounts of bisphenol and aromatic dihalide, in the presence of at least one alkali metal carbonate or bicarbonate used in an amount providing at least 2 gram atoms of alkali metal per mole of bisphenol, the alkali metal or metals being selected from sodium, potassium, rubidium, and caesium provided that the sole use of sodium carbonate and/or bicarbonate is excluded, and in the presence of a solvent having the formula*

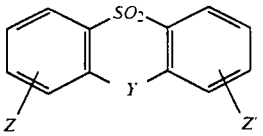

*where Y is a direct link, an oxygen atom or two hydrogen atoms (one attached to each benzene ring) and Z and Z' are hydrogen or a phenyl group, within the temperature range 150° C. to 400° C., the final temperature level during the polycondensation being sufficiently high to maintain the final polymer in solution, such that a polymer having an IV of at least 0.7 (which corresponds to an RV of at least 0.8) is obtained.*

*16. A polymer which may be obtained by the process of claim 15.*

* * * * *